United States Patent
Williams et al.

(10) Patent No.: US 10,338,556 B2
(45) Date of Patent: Jul. 2, 2019

(54) SYSTEM AND METHOD FOR DESCRIBING AND EXECUTING BEHAVIORS IN AUTONOMOUS AND SEMI-AUTONOMOUS DEVICES

(71) Applicant: Digital Aerolus, Inc., Shawnee, KS (US)

(72) Inventors: Thomas D. Williams, Shutesbury, MA (US); Ian J. McEwan, Pasadena, CA (US); Jeffery J. Alholm, Kansas City, MO (US)

(73) Assignee: Digital Aerolus, Inc., Shawnee, KS (US)

( * ) Notice: Subject to any disclaimer, the term of this patent is extended or adjusted under 35 U.S.C. 154(b) by 0 days.

(21) Appl. No.: 15/807,174

(22) Filed: Nov. 8, 2017

(65) Prior Publication Data

US 2018/0129179 A1    May 10, 2018

Related U.S. Application Data

(60) Provisional application No. 62/419,310, filed on Nov. 8, 2016.

(51) Int. Cl.
| | | |
|---|---|---|
| *G05B 19/042* | (2006.01) | |
| *B62D 5/04* | (2006.01) | |
| *G01C 3/06* | (2006.01) | |
| *G05D 1/00* | (2006.01) | |

(52) U.S. Cl.
CPC ....... *G05B 19/0426* (2013.01); *G05D 1/0088* (2013.01); *G05B 2219/2637* (2013.01)

(58) Field of Classification Search
CPC ....... G05B 19/042; G05D 1/08; B60W 30/09; B60W 50/00; B62D 5/04; G06F 17/00; G06F 165/00; G06F 15/50; F16H 59/10; G01C 3/06

See application file for complete search history.

(56) References Cited

U.S. PATENT DOCUMENTS

| | | | | |
|---|---|---|---|---|
| 5,375,059 A | * | 12/1994 | Kyrtsos | B60K 31/0008 342/357.24 |
| 5,555,503 A | * | 9/1996 | Kyrtsos | G01S 19/11 342/357.24 |
| 5,598,076 A | | 1/1997 | Neubauer et al. | |

(Continued)

FOREIGN PATENT DOCUMENTS

WO    2013130956 A1    9/2013

OTHER PUBLICATIONS

International Search Report and Written Opinion dated Jan. 16, 2018 for PCT Appln. No. PCT/US2017/060673; filed Nov. 8, 2017.

*Primary Examiner* — Yuri Kan (74) *Attorney, Agent, or Firm* — Hovey Williams LLP (57) ABSTRACT

A system and method of describing and executing autonomous or autonomous device behaviors via a computer-implemented system incorporating a fuzzy language, a simulator, and one or more runtimes. The fuzzy language combines high level behaviors and produces a set of parameter descriptions. The parameter descriptions are behavior characteristics whose values are not yet necessarily known or selected. The parameter descriptions are used via simulation to find relevant parameters and acceptable parameter values that result or will result in the autonomous or semi-autonomous device behaving as desired.

20 Claims, 6 Drawing Sheets

(56) References Cited

U.S. PATENT DOCUMENTS

| | | | | |
|---|---|---|---|---|
| 5,612,883 | A | * | 3/1997 | Shaffer ............. B60K 31/0008 340/435 |
| 6,324,530 | B1 | | 11/2001 | Yamaguchi et al. |
| 6,385,539 | B1 | | 5/2002 | Wilson et al. |
| 6,945,781 | B2 | | 9/2005 | Perry et al. |
| 8,150,621 | B1 | | 4/2012 | Phillips et al. |
| 8,577,517 | B2 | | 11/2013 | Phillips et al. |
| 2002/0178855 | A1 | * | 12/2002 | Giefer .................. F16H 59/105 74/473.1 |
| 2003/0028285 | A1 | * | 2/2003 | Zura ...................... G06Q 10/08 700/241 |
| 2003/0069676 | A1 | * | 4/2003 | Kanda .................. B62D 5/0463 701/41 |
| 2004/0088093 | A1 | * | 5/2004 | Yao ........................ B62D 6/008 701/44 |
| 2008/0015746 | A1 | * | 1/2008 | Bertazzoni ........... B63H 21/213 701/21 |
| 2014/0142799 | A1 | | 5/2014 | Ferguson et al. |
| 2014/0214259 | A1 | | 7/2014 | Trepagnier et al. |
| 2015/0073662 | A1 | * | 3/2015 | Schmudderich ......... B62D 6/00 701/41 |
| 2016/0314224 | A1 | | 10/2016 | Wei et al. |
| 2018/0050692 | A1 | * | 2/2018 | Kim ................. B60W 50/0098 |

* cited by examiner

FIG. 3

```
behavior Track is
  control Position toward Target via Velocity behavior Stay is
  on activation set Here to Position
  control Position toward Here via Velocity behavior AvoidContact is
  control Position awayfrom nearest(Objects.RelativePosition)
          via Velocity with closeFunc where nearest(List) is (fold (minimum) infinity List)

behavior Follow is
  activate Track
  activate AvoidContact behavior FollowEx is
  control Position toward Target via Velocity
  control Position awayfrom nearest(Objects.RelativePosition)
          via Velocity with CloseFunc behavior WaitHere is
  activate Stay
  activate AvoidContact behavior Flock is
  activate Follow
  control Position toward mean(Flock.RelativePosition) via Velocity behavior OrbitTarget is
  activate AvoidContact
  control Position toward orbit(Target,Radius,OrbitSpeed,0) via Velocity where orbit(C, R, S, T0) is (C + R * exp( 2 * pi * im * S * (Time-T0) ))

behavior Acceleration is
  control MeasuredVelocity toward Velocity via Thrust behavior FollowWhenA is
  activate AvoidContact when near(nearest(Objects.RelativePosition))
  actiavte Track otherwise behavior FollowWhenB is
  control Position awayfrom Nearest via Velocity when near(Nearest)
```

```
345    control Position toward Target via Velocity otherwise
346    where Nearest is nearest(Objects.RelativePosition)
347
348 behavior UpDown is
349    on activation set Here to Position
350    activate AvoidContact
351    activate GoUp
352
353 behavior GoUp
354    control Position toward (Here + Height) via Velocity
355    on near(Here + Height) activate GoDown
356
357 behavior GoDown
358    on activation deactivate GoUp
359    on near(Here) activate UpDownFinished
360    control Position toward Here via Velocity
361
362 behavior UpDownFinished
363    deactivate GoDown
364    deactivate AvoidContact
365
366 behavior Boomerang
367    on activation set Here to Position
368    on activation set Start to Time
369    activate BoomOrbit
370    activate AvoidContact
371    on near(Here+2*Radius) activate BoomerangBack
372
373 behavior BoomerangBack
374    on activation deactivate Boomerang
375    on near(Here) activate BoomerangStay
376
377 behavior BoomerangStay
378    on activation deactivate BoomerangBack
379    on activation deactivate BoomOrbit
380    activate Stay
381
382 behavior BoomOrbit
383    control Position toward bOrbit(Here+Radius, Radius, OrbitSpeed, Start)
384            via Velocity
```

FIG. 4

```
400 Velocity = Alpha * (Target - Position);
401
402 Velocity = Alpha * closeFunc(Position -
403          nearest(map(getAttribute, Objects, RelativePosition)));
404
405 Velocity = prioritize(
406    Alpha1 * (Target - Position),
407    Alpha2 * closeFunc(Position -
408      nearest(map(getAttribute, Objects, RelativePosition)))
409    );
```

SYSTEM AND METHOD FOR DESCRIBING AND EXECUTING BEHAVIORS IN AUTONOMOUS AND SEMI-AUTONOMOUS DEVICES

RELATED APPLICATIONS

This regular utility non-provisional patent application claims priority benefit with regard to all common subject matter of earlier filed U.S. Provisional Patent Application titled "METHOD FOR DESCRIBING AND EXECUTING BEHAVIORS IN AUTONOMOUS VEHICLES", Ser. No. 62/419,310, filed on Nov. 8, 2016, which is hereby incorporated by reference in its entirety into the present application.

BACKGROUND

Robotics and autonomous or semi-autonomous device control programs are unique in computing in that part of their state exists outside of the software and hardware on which they are executing. The real world or an autonomous or semi-autonomous device's environment is part of its control program's state, even if it is not directly known, and actions the control program takes can affect the environment, sometimes in non-deterministic ways. The control program must convert that external state into internal data via sensors and measurements and must be able to handle errors and uncertainties that would never arise in normal programs while still performing the desired behavior.

High level behaviors in most existing robotic and autonomous or semi-autonomous device systems are scripted or hard coded to use specific parts of this data to perform the desired tasks. However, scripts, while higher level, are still deterministic. For example, a "follow me" behavior might involve measuring the location of a user and autonomous or semi-autonomous device with GPS, computing the delta between them, and commanding the autonomous or semi-autonomous device to move by some fraction of this delta.

Some systems use hard code but with parameters that can be changed in real time to adjust to changing conditions. However, these can only be applied to parameters that can be easily derived from measurements or are amenable to computer learning techniques and must change much more slowly than the response time of the autonomous or semi-autonomous device.

A few systems allow for scripts that have emergent properties. For example, a bird-like flocking behavior can be constructed as three-part fuzzy script: "if too far from the center of the flock then move toward the center; if too far from the target then move toward the target; if too close to a neighbor then move away from the neighbor". This can be translated to a hard-coded C program, or even as a single mathematical expression and when executed produces exactly the behavior one sees from birds flocking.

Unfortunately, all of these systems suffer from the same failing in that these systems focus on how to implement a behavior and not on describing the desired behavior. Consequently, combining different behaviors can be difficult especially if those behaviors overlap in some way and have radical unexpected consequences.

SUMMARY

Embodiments of the present invention solve the above-described and other problems and limitations by providing a system and method that combines, manages, and manipulates autonomous or semi-autonomous vehicle or apparatus (hereinafter "device") behaviors in an automatic and systematic way independent of the behaviors' methods of implementation. The invention described herein improves performance of the autonomous or semi-autonomous device's control system itself and hence improves control of the autonomous or semi-autonomous device.

An embodiment of the invention is a method of describing and executing autonomous or semi-autonomous device behaviors via a computer-implemented system incorporating a fuzzy language, a simulator, and one or more runtimes. First, a behavior source file including high level behaviors such as "Track", "Stay", and "Avoid Contact" is received and passed through a compiler, which produces a set of parameter descriptions and an intermediary executable file. The parameter descriptions are behavior characteristics whose values are not yet necessarily known or selected. The intermediary executable file may be in any computer language such as C, C++, or OCaml.

The intermediary executable file may then be compiled and/or linked with a simulation environment, runtime, or application programming interface (API) to produce an executable file. The executable file and the parameter descriptions are then used via simulation to find relevant parameters and acceptable parameter values that result or will result in the autonomous or semi-autonomous device behaving as desired.

The intermediary file and acceptable parameter values are compiled in conjunction with a runtime or API to produce an executable control program. The autonomous or semi-autonomous device may then be controlled according to the executable control program.

The above-described invention provides several advantages including improved control system performance and hence improved control of the autonomous or semi-autonomous device. For example, the fuzzy language and runtimes allow behaviors to be constructed from a combination of other behaviors where some of those behaviors can be mapped to script-like programs and/or emerge from script-like programs or results learned from the environment. The fuzzy language provides detailed information to downstream components for analysis, simulation and execution. This facilitates the simulator to be of sufficient fidelity that the behaviors in simulation are indistinguishable from those of the actual autonomous or semi-autonomous device. This in turn allows for the automated or assisted selection of control parameters and the identification and control of emergent behaviors and/or properties that might not have been predicted.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular configurations of the present invention can include a variety of combinations and/or integrations of the embodiments described herein.

Figure 7:
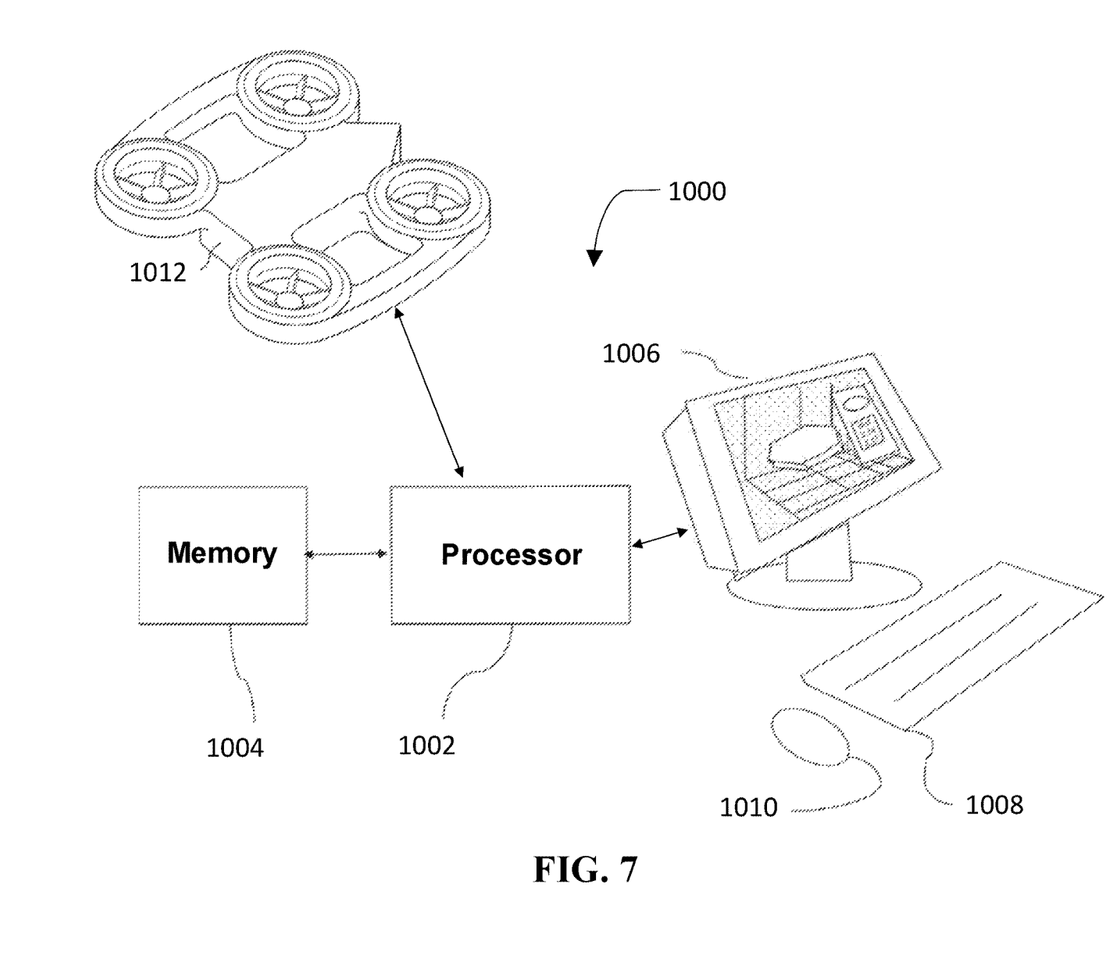
FIG. 7 is a schematic diagram of a computer-implemented system and a semi-autonomous device constructed in accordance with an embodiment of the invention.

Turning to the drawing figures, and particularly FIG. 7, embodiments of the present invention may be implemented on a computer-implemented system 1000 having a processor 1002, controller, control system, and/or other electronic circuitry. The computer system 1000 and/or processor 1002 may also include a circuit board, memory 1004, and other electronic components such as a display 1006 and inputs 1008, 1010 for receiving external commands and a transmitter for transmitting data and electronic instructions.

The processor 1002 may implement aspects of the present invention with one or more computer programs stored in or on computer-readable medium such as memory 1004 residing on or accessible by the processor 1002. Each computer program preferably comprises an ordered listing of executable instructions for implementing logical functions and can be embodied in any non-transitory computer-readable medium, such as the memory 1004 (described below), for use by or in connection with an instruction execution system, apparatus, or device, such as a computer-based system, processor-containing system, or other system that can fetch the instructions from the instruction execution system, apparatus, or device, and execute the instructions.

The memory 1004 may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 1:
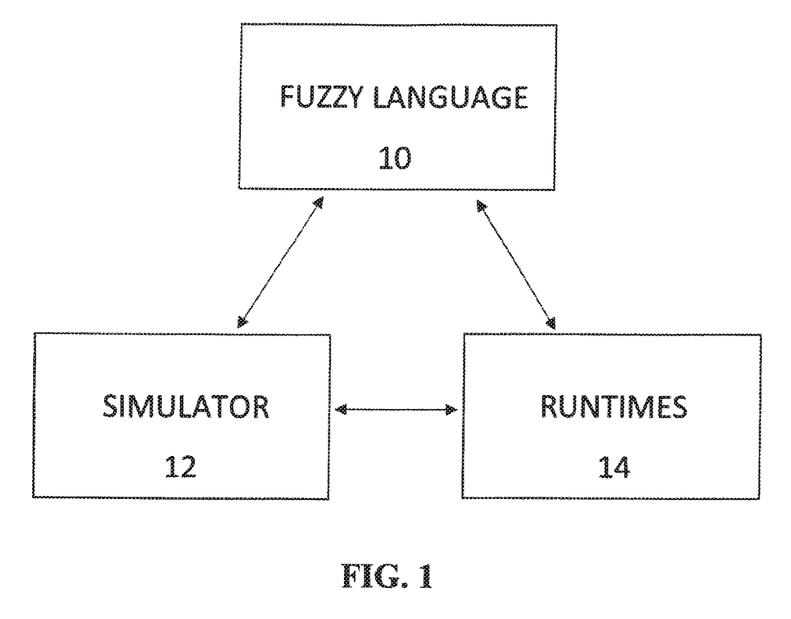
FIG. 1 is a schematic diagram of modules of the present invention.

Turning to FIG. 1, the computer-implemented system 1000 incorporates three independent parts: A fuzzy language 10, a simulator 12, and one or more runtimes 14 (for execution and/or simulation). Each part can act independently of the other parts.

The fuzzy language 10 allows combining of behaviors to be described and is tailored toward the uncertain and imperfect real world an autonomous or semi-autonomous device will operate in instead of the deterministic world of hardware. The fuzzy language 10 is structured such that a simulation (described below) can execute the exact same program in order to search for various parameters that cannot be given "a priori" but are essential to proper execution. The fuzzy language 10 can also generate other useful information to correct or enhance emergent properties.

The following fuzzy language examples are not meant to limit the full extent of the fuzzy language 10 or other construction that accomplishes the same task but are meant only to illustrate that a small focused language can be used to produce "trained pet"-like behaviors as part of a system that separates the description of behaviors, control parameters, and the implementation of the control modules for those behaviors. All values in a "Theory-of-World" of the autonomous or semi-autonomous device using these examples are scaled to be natural. That is, these values are based on the approximate range of 0 to 1. For example, the minimum and maximum velocity of the autonomous or semi-autonomous device is 0 and 1 velocity units respectively. Something that is 1 unit distance away could be defined as close or far depending on context. Importantly, the fuzzy language focuses on the description of the parameters and not on the explicit implementation thereof.

Figure 2:
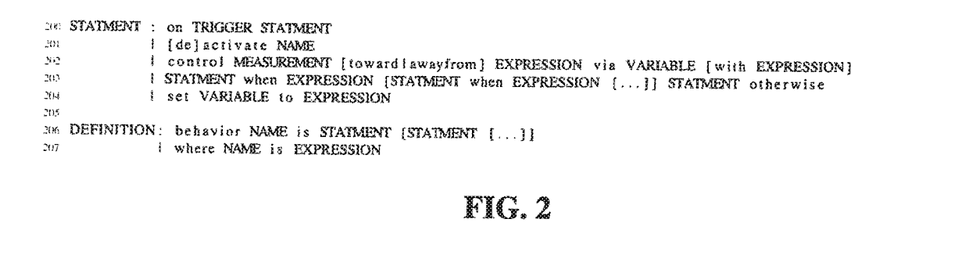
FIG. 2 is a portion of exemplary computer code for implementing aspects of the invention.

Turning to FIG. 2, exemplary fuzzy language grammar is shown. For clarity, variables, functions, and behaviors defined in the fuzzy language 10 or the worldview of the autonomous or semi-autonomous device are capitalized. Language words and/or external library functions are lowercase. The excerpt includes five statement types (lines 200-204) and two definition clauses (lines 206 and 207). The "on" statement of line 200 allows for actions to occur on specific events such as activation of a behavior or logic variable. Line 201 allows the activation or deactivation of other behaviors. The "control" statement of line 202 allows the behavior to map measurements or events to actions. The "when otherwise" construction of line 203 allows conditional behavior execution. The "set" statement of line 204 allows direct assignment of a variable. The behavior declaration of line 206 shows how behaviors may be defined as a list of statements. The "where" declaration of line 207 allows high level functions to be defined. All statements in a behavior may be executed simultaneously and continuously and can be arranged in any order.

Figure 3:
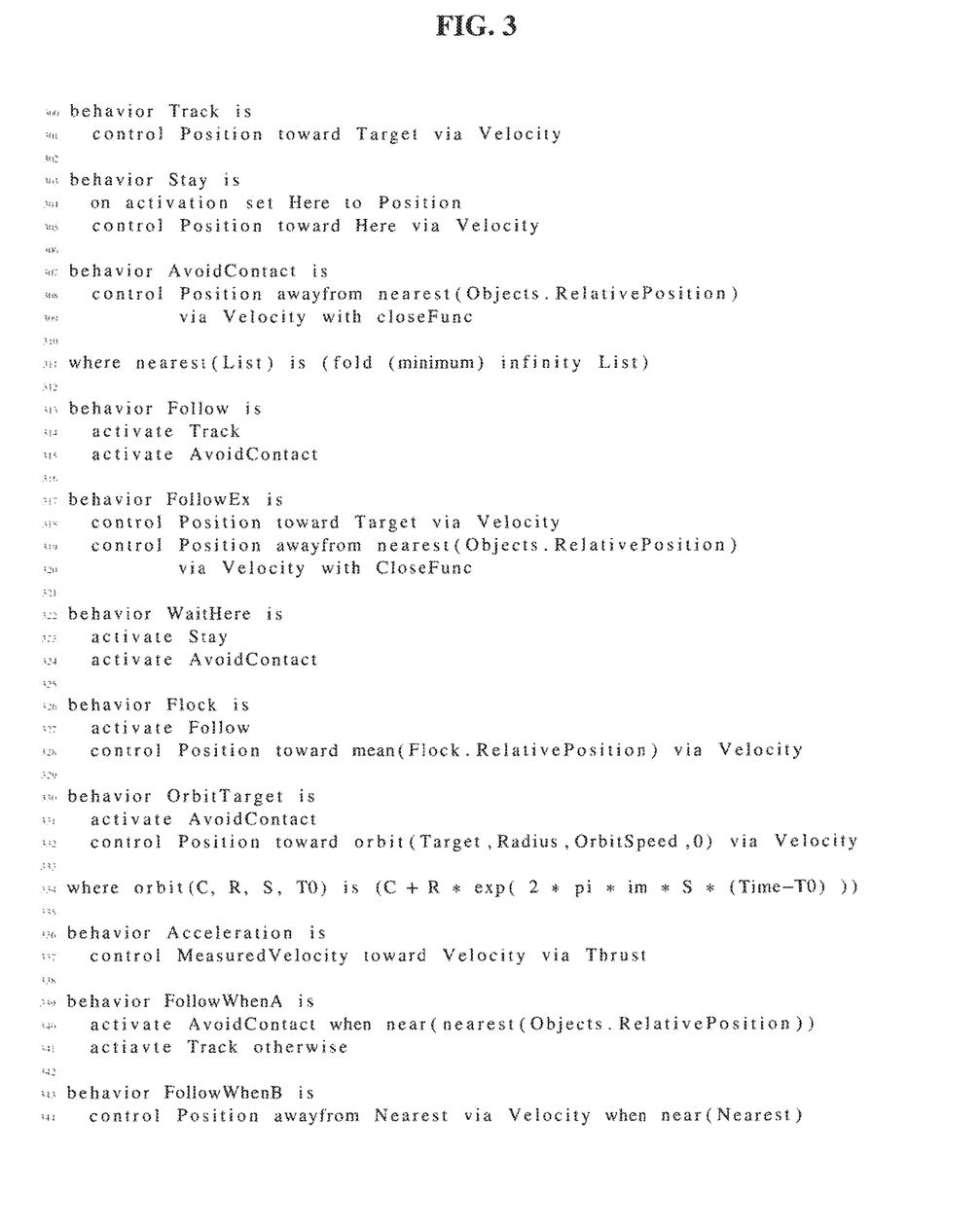
FIG. 3 is another portion of exemplary computer code for implementing aspects of the invention.
Figure 4:
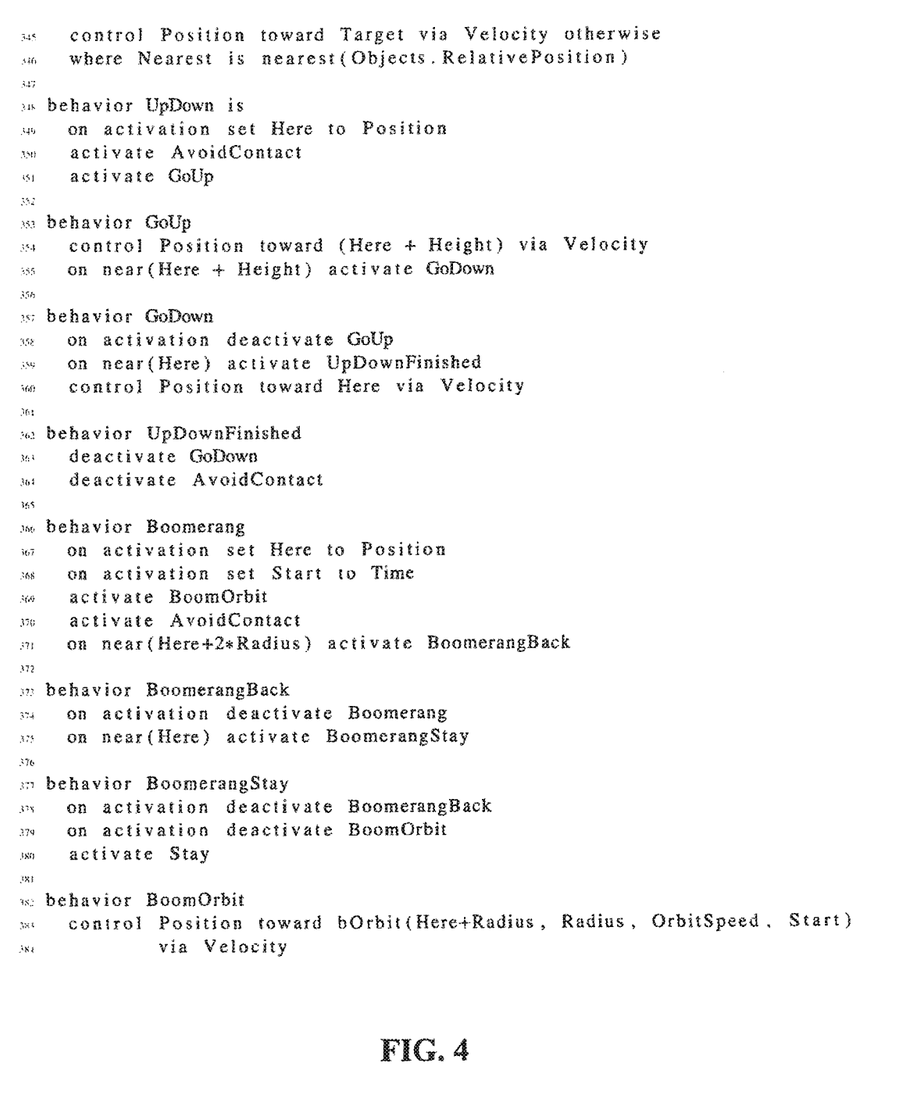
FIG. 4 is a continuation of the exemplary computer code of FIG. 3.

Turning to FIGS. 3 and 4, exemplary behaviors described in the fuzzy language 10 are shown. The type of controller for the "control" statements, their parameters, and the relative weightings between statements are unknown to the language source and its initial compilation. The language compiler will necessarily produce a description of these missing parameters. The language compiler does not attempt to define the values of these parameters forcing the user to focus on behavior structure. However, the values must be defined before the final executable can be assembled. Some of these parameters, such as the type of controller, may be selected by a human user, but many will be non-obvious and require experimentation, analysis tools, and other searches.

EXAMPLE 1

"Track"—The "Track" behavior of lines 300 and 301 moves the autonomous or semi-autonomous device toward a target. This is a simple deterministic behavior, where line 301 could compile to a simple proportionality controller which would have a C expression such as line 400 of FIG. 5 where Alpha is a control constant that isn't known at compile time (see below). This sets the autonomous or semi-autonomous device's velocity to correct for the error between where the device is and where the device was commanded to be. Note the fuzzy language 10 is not concerned with how the underlying controller is implemented, and the choice of controller implementation is itself a parameter.

EXAMPLE 2

"Stay"—For the "Stay" behavior of lines 303-305, the autonomous or semi-autonomous device should stay in one location, and if for any reason it does not do so (maybe the autonomous or semi-autonomous device is pushed), the autonomous or semi-autonomous device should return to that position. This is similar to the "Track" behavior but with the initial position as the target. Line 304 show the variable "Here" set to the current position on activation of the behavior and line 305 is the same kind of control line as line 301.

EXAMPLE 3

Figure 5:
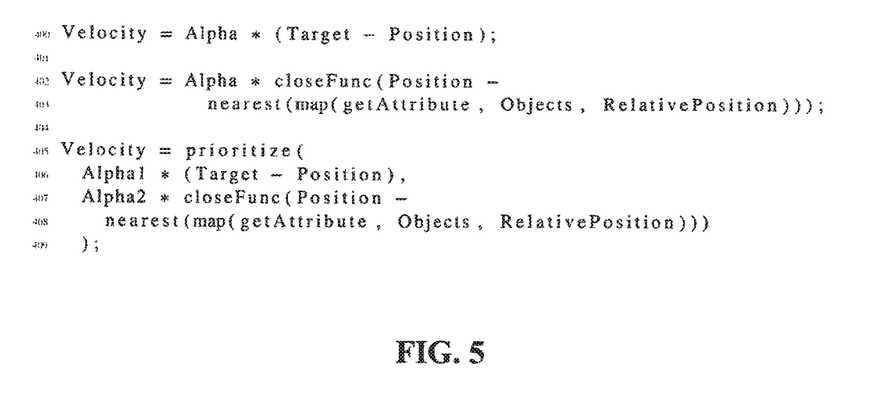
FIG. 5 is another portion of exemplary computer code for implementing aspects of the invention.

"AvoidContact"—For many behaviors such as the "AvoidContact" behavior of lines 307-309, a little more analysis is needed. This is again a simple deterministic behavior but with two helper functions "nearest" and "closeFunc." "Objects" is a list of all the discrete objects the autonomous or semi-autonomous device knows about in the world. This might be other autonomous or semi-autonomous devices, way markers, or obstacles. "Objects.RelativePosition" is a list of all their relative positions. The helper function "nearest" could either be implemented in a library and might translate to something like the C expression of lines 402-403 or if (as in this case) it can be represented as a high level expression, then it can be stated in the behavior of line 311, which uses terminology from functional programming. A "fold" is a loop function that passes the result of each iteration to the next, returning the result of the last. As can be seen from the C expression of line 403, the helper function used with the term "with" in line 309 modifies the result of whatever controller expression is used such that non-linear weightings that are independent of the choice of controller implementation can be specified.

EXAMPLE 4

"Follow"—The above example "Track" isn't particularly intelligent in that the autonomous or semi-autonomous device will keep bumping into the target if it is faster than the target. This can be fixed by running the "Track" and "AvoidContact" behavior simultaneously either by reference to lines 313-315 or explicitly via lines 317-320. In this example, an unwanted behavior emerges when the autonomous or semi-autonomous device gets close to its target because the two simple behaviors will be in conflict with each other if not balanced correctly. Importantly, the present invention does not try to solve this conflict in the description of behaviors, but instead treats it as an orthogonal problem. This example might compile to lines 405-409 of FIG. 5.

Example 5

"WaitHere"—Combining examples "Stay" and "AvoidContact", as shown in lines 322-324, also gives a rich behavior. Specifically, "WaitHere" causes the autonomous or semi-autonomous device to stay in one place while avoiding any contact. The autonomous or semi-autonomous device can be herded away from the "Stay" position but will constantly try to return to it. The autonomous or semi-autonomous device will even be able to go around the obstacle if the obstacle isn't positioned exactly right. If the obstacle is at exactly the stay position then the autonomous or semi-autonomous device might bounce or orbit around it, which may or may not be desirable and must be analyzed either by experiment or simulation.

EXAMPLE 6

"Flock"—A flocking behavior shown in lines 326-328 tracks a center of the flock and avoids bumps. This can be used to evaluate the effectiveness of any embodiment of this system.

EXAMPLE 7

"OrbitTarget"—In this example shown in lines 330-332, the fuzzy language 10 is augmented with geometric expressions in two dimensions and could be used with a drone that orbits around a target from above. "Horizontal Position" and "Velocity" are two-dimensional variables that can be expressed as vectors and/or as a complex number. For example, a circle of radius R and center C can be described in the complex plane by the expression $C+Re^{i\theta}$ where $\theta$ is an angle, and an orbit of speed S starting at time to can be described as $C+Re^{2\pi i S(t-t_o)}$ where t is time in units compatible with S. This is given in the function "orbit" in line 334.

EXAMPLE 8

"Acceleration"—Some autonomous or semi-autonomous devices, such as flying drones, control their movement via thrusters (which generate an acceleration) and not via velocity directly. This is typically handled by the avionics runtime, but could be encoded using similar controllers to the examples of lines 336 and 337.

EXAMPLE 9

"Changing Behavior"—One way to avoid conflict is to switch which behavior is active based on a fuzzy condition. Lines 339-341 show the behavior "AvoidContact" being activated when near another object, and the "Track" behavior being active otherwise. Lines 343-346 show another implementation of this behavior.

EXAMPLE 10

"Going up and coming down"—With any language focused on one task it can be harder to do some things that seem simple in other languages. For example, a scripted set of actions can be implemented without augmenting the language with explicit sequences, but it has to be encoded as activating and deactivating behaviors in turn. Here, the "UpDown" behavior 348-364 is a "script" for a drone to go up to some height, and then immediately return to its starting location. There is a considerable advantage in encoding the script this way; that is behaviors such as "AvoidContact" are still seamlessly combined, and any interactions can be analyzed by the simulator 12 (described below).

EXAMPLE 11

"Boomerang"—A second example of a script is the boomerang behavior of lines 366-384. When activated, the autonomous or semi-autonomous device orbits away from the starting point around a center given by "Radius" until it returns to its starting position and then waits. This illustrates a scripted part (lines 366-380) in conjunction with a continuous part (lines 382-384). That is, the "BoomOrbit" behavior 382 remains active while the "Boomerang" behavior (line 366), the "BoomerangBack" behavior (line 372), and the "BoomerangStay" behavior (line 376) activate in sequence.

The simulator 12 models both the autonomous or semi-autonomous device and its environment. The simulator 12 understands the requirements of the behavior compiler and the target autonomous or semi-autonomous device and provides a virtual environment for experimentation. The simulator 12 is also coupled with a framework for automatically searching for good parameters. This permits accurate responses to test cases as well as providing a traceability when unwanted behaviors arise. Unlike traditional program simulators, the simulator 12 responds in the same way as the real world.

The results of simulations performed via the simulator 12 are not simply profiles or statistics used to optimize the program, but instead are a complete analysis of how and why behaviors operate and the behaviors' effects on the environment. This allows the balance between behaviors to be changed to enhance or dampen emergent behaviors, correct for conflicts between behaviors, and produce desired behaviors such as 'fetch' that still work in the presence of obstacles or errors.

The following examples show some approaches to automatically searching for parameters using a coupled simulation. For illustrative purposes, the controller implementation is chosen to use simple proportional controllers and the scale parameter that defines "nearness", such as 1 meter, is also be chosen by hand.

EXAMPLE 12

Finding Coefficients "Monte Carlo"—The example "Flock" above has three control statements which will require three proportionality ($\alpha$) parameters, whose very rough ranges are known by analysis of units, and their relative priority weightings (w). This makes a six member parameter vector: ($\alpha 1$, $\alpha 2$, $\alpha 3$, w1, w2, w3). A normal Monte Carlo search is performed, where a large number of random choices over the known ranges for this vector are given, one at a time, to the simulator 12. The simulator 12 performs a set of runs using representative environments on each vector. The vector that performs the best is selected.

EXAMPLE 13

Finding Coefficients "Monte Carlo 2"—The "Monte Carlo" example above has the usual Monte Carlo problem of not being very focused and requires many tests that are nowhere near acceptable. In the case where there are clusters of good parameters, fewer tests can be done to first find these clusters. Then best vectors from each cluster are selected and a Monte Carlo simulation is run for each with a tight random distribution focused around the selected vector. The best vector overall is then selected.

EXAMPLE 14

Finding Coefficients "Monte Carlo 3"—In either of the above Monte Carlo examples examples, there might be cases where the top few vectors are from different clusters and whose performance is hard to distinguish. In this case each vector could be tested in the real autonomous or semi-autonomous device and a choice made at that point, or the results could be fed back into the simulation.

EXAMPLE 15

Finding Coefficients "Amoeba"—In the case where some subset of perimeters are known to, or can be shown to, form a smooth function over their allowed ranges, a more directed search can be done by, for example, an amoeba method. This assertion requires an analysis of the resultant mathematical representation of the controller code. The language parameter analysis along with a mathematical description of the controller type, if available, makes this possible by automatic analysis.

The runtimes 14 provide both a traditional execution environment to actually run the program, and all the information that the program might need which includes information about the external environment. This information might come from direct measurement or from modeling. The complete set of present measurements, models, passed values and future predictions constitutes the autonomous or semi-autonomous device's "Theory of World".

Figure 6:
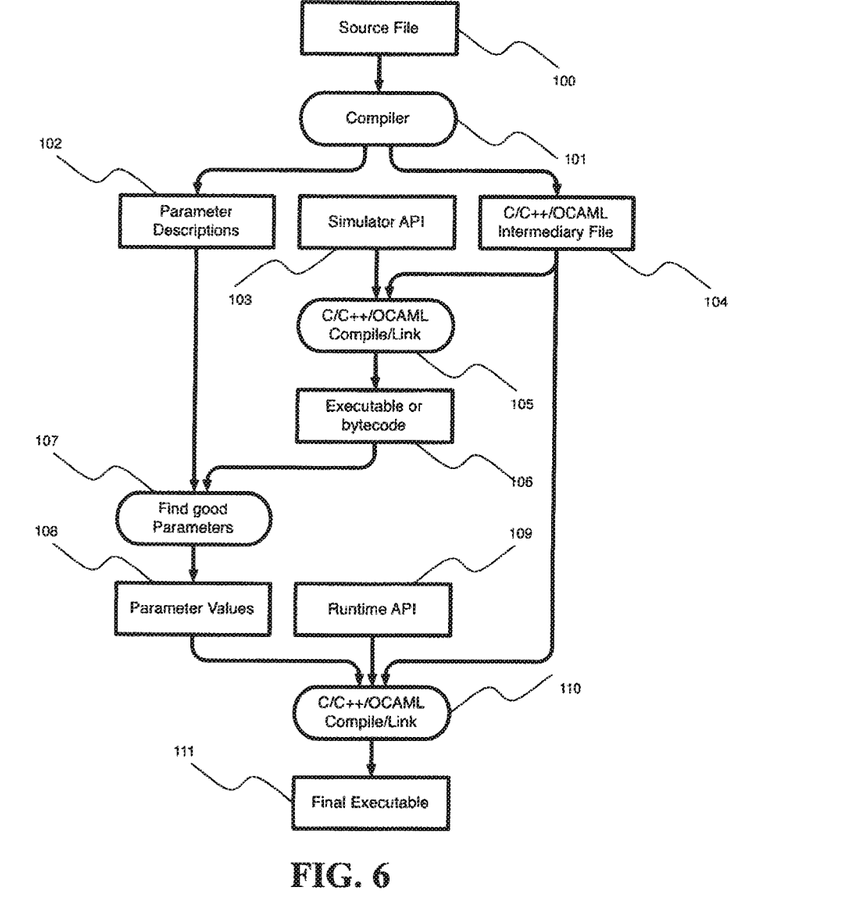
FIG. 6 is a flow chart of a method of describing and executing behaviors in an autonomous or semi-autonomous device.

Turning to FIG. 6, a method of describing and executing autonomous or semi-autonomous device behaviors will now be described in detail. First, a behavior source file 100 is received, as shown in block 100. The behavior source file 100 may be a table or set of high level behaviors such as "Track", "Stay", and "Avoid Contact" (described above).

The behavior source file is then passed through a compiler, as shown in block 101. The compiler produces a set of parameter descriptions, as shown in block 102, and an intermediary executable file, as shown in block 104. The parameter descriptions are behavior characteristics whose values are not yet necessarily known or selected. The intermediary executable file may be in any computer language such as C, C++, or OCaml.

The intermediary executable file may then be compiled and/or linked with a simulation environment, runtime 14, or application programming interface (API) to produce an executable file, as shown in blocks 103, 105, and 106. The executable file and the parameter descriptions are then used via simulation to find relevant parameters and acceptable parameter values that result or will result in the autonomous or semi-autonomous device behaving as desired, as shown in blocks 107 and 108.

The intermediary file and acceptable parameter values are compiled in conjunction with a runtime 14 or API to produce an executable control program, as shown in blocks 109-111. The autonomous or semi-autonomous device may then be controlled according to the executable control program. Some of the parameter values may be passed to the executable control program and/or modified at run time.

The above-described invention provides several advantages including improved control system performance and hence improved control of the autonomous or semi-autonomous device. For example, the fuzzy language 10 and runtimes 14 allow behaviors to be constructed from a combination of other behaviors where some of those behaviors can be mapped to script-like programs and/or emerge from script-like programs or results learned from the environment. The fuzzy language 10 provides detailed information to downstream components for analysis, simulation and execution. This facilitates the simulator 12 to be of sufficient fidelity that the behaviors in simulation are indistinguishable from those of the actual autonomous or semi-autonomous device. This in turn allows for the automated or assisted selection of control parameters and the identification and control of emergent behaviors and/or properties that might not have been predicted.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A computer-implemented method of describing and executing behaviors of an autonomous or semi-autonomous device, the computer-implemented method comprising:
   receiving a behavior source file;
   compiling the behavior source file into an intermediary executable file and a set of parameter descriptions;
   linking the intermediary executable file with a simulator so as to produce an executable file;
   running the executable file in conjunction with the parameter descriptions in the simulator so as to find acceptable parameter values via a simulation;
   compiling the intermediary executable file, a runtime of the autonomous or semi-autonomous device, and the acceptable parameter values so as to produce an executable control program; and
   controlling the autonomous or semi-autonomous device according to the executable control program so that the autonomous or semi-autonomous device behaves according to the acceptable parameter values.

2. The computer-implemented method of claim 1, wherein at least some of the parameter values are coefficients, the step of running the executable file in conjunction with the parameter descriptions to find acceptable parameter values including finding coefficients via a Monte Carlo search.

3. The computer-implemented method of claim 2, further comprising identifying a number of clusters of potential parameters, selecting a best parameter set from each cluster, and selecting a best overall parameter set.

4. The computer-implemented method of claim 3, further comprising testing the best parameter sets via the autonomous or semi-autonomous device to select the best overall parameter set.

5. The computer-implemented method of claim 3, further comprising testing the best parameter sets by entering the best parameter sets into the simulation.

6. The computer-implemented method of claim 1, wherein the step of running the executable file in conjunction with the parameter descriptions includes running an amoeba search to find the acceptable parameter values.

7. The computer-implemented method of claim 1, wherein the step of running the executable file in conjunction with the parameter descriptions in the simulator includes simulating the autonomous or semi-autonomous device and an environment of the autonomous or semi-autonomous device.

8. The computer-implemented method of claim 1, further comprising the step of passing some of the parameter values to the executable control program at run time.

9. The computer-implemented method of claim 1, further comprising the step of modifying some of the parameter values at run time.

10. The computer-implemented method of claim 1, wherein some of the parameter values are human-selected.

11. A computer-implemented system for describing and executing behaviors of an autonomous or semi-autonomous device, the computer-implemented system comprising:
    a processor configured to:
      receive a behavior source file;
      compile the behavior source file into an intermediary executable file and a set of parameter descriptions;
      link the intermediary executable file with a simulator so as to produce an executable file;
      run the executable file in conjunction with the parameter descriptions in the simulator so as to find acceptable parameter values via a simulation;
      compile the intermediary executable file, a runtime of the autonomous or semi-autonomous device, and the acceptable parameter values so as to produce an executable control program; and
      control the autonomous or semi-autonomous device according to the executable control program so that the autonomous or semi-autonomous device behaves according to the acceptable parameter values.

12. The computer-implemented system of claim 11, wherein at least some of the parameter values are coefficients, the processor being further configured to find the coefficients via a Monte Carlo search.

13. The computer-implemented system of claim 12, wherein the processor is further configured to identify a number of clusters of potential parameters, select a best parameter set from each cluster, and select a best overall parameter set.

14. The computer-implemented system of claim 13, wherein the processor is further configured to test the best parameter sets via the autonomous or semi-autonomous device to select the best overall parameter set.

15. The computer-implemented system of claim 13, wherein the processor is further configured to test the best parameter sets by entering the best parameter sets into the simulation.

16. The computer-implemented system of claim 11, wherein the processor is further configured to run an amoeba search to find the acceptable parameter values.

17. The computer-implemented system of claim 11, wherein the processor is further configured to simulate the autonomous or semi-autonomous device and an environment of the autonomous or semi-autonomous device.

18. The computer-implemented system of claim 11, wherein the processor is further configured to pass some of the parameter values to the executable control program at run time.

19. The computer-implemented system of claim 11, wherein the processor is further configured to modify some of the parameter values at run time.

20. The computer-implemented system of claim 11, wherein the processor is further configured to receive human-selected parameter values.

* * * * *